(12) United States Patent
Orofino, II et al.

(10) Patent No.: US 7,835,895 B1
(45) Date of Patent: Nov. 16, 2010

(54) SIGNAL INHERITANCE IN A GRAPHICAL MODEL ENVIRONMENT

(75) Inventors: Donald P. Orofino, II, Sudbury, MA (US); Steven G. Conahan, Jamaica Plain, MA (US); Navan Ruthramoorthy, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 2121 days.

(21) Appl. No.: 10/722,746

(22) Filed: Nov. 25, 2003

(51) Int. Cl.
*G06F 17/50* (2006.01)
(52) U.S. Cl. .......................... 703/13; 345/440; 345/522
(58) Field of Classification Search .................... 703/13; 345/418, 440, 522, 581; 717/106, 105
See application file for complete search history.

(56) References Cited

U.S. PATENT DOCUMENTS 5,659,723 A * 8/1997 Dimitrios et al. ........ 707/103 R
7,324,931 B1 * 1/2008 Warlock ...................... 703/13
2005/0107998 A1 * 5/2005 McLernon et al. ............ 703/22

OTHER PUBLICATIONS

Taniar et al., D. Inheritance and Parallelization: Emerging Object-Oriented and Parallel Technologies for High Performance Database Systems, IEEE, High-Performance Computing on the Information Superhighway, Apr.-May 1997, pp. 639-644.*

* cited by examiner

*Primary Examiner*—Russell Frejd
(74) *Attorney, Agent, or Firm*—Lahive & Cockfield, LLP; Kevin J. Canning (57) ABSTRACT

A method is provided for extending the capability of signals in a graphical model environment. Features of a first signal type and features of a second signal type are combinable to form a combined signal type while allowing existing blocks in the graphical model environment to process the combined signal type without modification of the existing blocks. A block intended to process a signal of the first type that receives the composite signal type process the portion of the signal corresponding to the first type without regard for the second signal type portion of the combined signal. Moreover, the method allows for modification or creation of blocks that add features to a signal to form a combined signal type.

79 Claims, 8 Drawing Sheets

SIGNAL INHERITANCE IN A GRAPHICAL MODEL ENVIRONMENT

TECHNICAL FIELD OF THE INVENTION

The present invention generally relates to data processing and, more particularly, to inheritance in a graphical model environment.

BACKGROUND

Various classes of graphical models describe computations that can be performed on computational hardware, such as a computer, microcontroller, FPGA, and custom hardware. Classes of such graphical models include time-based block diagrams such as those found within Simulink® from The MathWorks, Inc. of Natick, Mass., state-based and flow diagrams, such as those found within Stateflow® from The MathWorks, Inc. of Natick, Mass., data-flow diagrams, circuit diagrams, and software diagrams, such as those found in the Unified Modeling Language. A common characteristic among these various forms of graphical models is that they define semantics on how to execute the diagram.

Historically, engineers and scientists have utilized graphical models in numerous scientific areas such as Feedback Control Theory and Signal Processing to study, design, debug, and refine dynamic systems. Dynamic systems, which are characterized by the fact that their behaviors change over time, or the fact that their states change or the fact that their behaviors change due to a system environment, are representative of many real-world systems. Graphical modeling has become particularly attractive over the last few years with the advent of software packages such as Simulink® from The MathWorks, Inc. of Natick, Mass. Such packages provide sophisticated software platforms with a rich suite of support tools that makes the analysis and design of dynamic systems efficient, methodical, and cost-effective.

A dynamic system, either natural or man-made, is a system whose response at any given time is a function of its input stimuli, its current state, the current time, and other input parameters. Such systems range from simple to highly complex systems. Physical dynamic systems include a falling body, the rotation of the earth, bio-mechanical systems (muscles, joints, etc.), bio-chemical systems (gene expression, protein pathways), weather and climate pattern systems, etc. Examples of man-made or engineered dynamic systems include: a bouncing ball, a spring with a mass tied on an end, automobiles, airplanes, control systems in major appliances, communication networks, audio signal processing, nuclear reactors, a stock market, etc. Professionals from diverse areas such as engineering, science, education, and economics build graphical models of dynamic systems in order to better understand system behavior as it changes with the progression of time. The graphical models aid in building "better" systems, where "better" may be defined in terms of a variety of performance measures such as quality, time-to-market, cost, speed, size, power consumption, robustness, etc. The graphical models also aid in analyzing, debugging and repairing existing systems (be it the human body or the anti-lock braking system in a car). The models may also serve an educational purpose of educating others on the basic principles governing physical systems. The models and results are often used as a scientific communication medium between humans. The term "model-based design" is used to refer to the use of graphical models in the development, analysis, and validation of dynamic systems.

Graphical modeling environments such as Simulink®, assist in simplifying the process of designing, simulating, and implementing dynamic systems. A graphical model is a representation of a real-world system through a graph containing nodes (i.e. blocks) interconnected by arcs (i.e. lines). Blocks are functional entities that perform mathematical operations, transformations or both on the data and information being processed by the system. The lines, often referred to as signals in the art, represent streams of information, such as data, data types, timing information, and control information, flowing into, out of, and between various blocks.

Signals in current graphical model environments have a number of associated attributes, such as dimensions and data type. Blocks that operate on such signals expect that attributes to be of given pre-defined data types. In order to handle a custom data type for such an attribute, the code for the blocks would have to be rewritten. As a result, the blocks are somewhat inflexible in their handling of such data types for attributes of signals.

SUMMARY OF THE INVENTION

The illustrative embodiment of the present invention enables the inheritance of signal attributes, signal methods, or both, such as, data types, signal rendering operations, or both in a graphical model environment. In this manner, signals may be extended to define new signal types or define subclasses of known signal types. Furthermore, processing of these signals within a graphical model environment is adaptable due to inherited signal types.

The illustrative embodiment provides an approach that allows a graphical model to support a signal representing a variety of characteristics beyond a predefined data type. For example, a user can define signals or signal types as objects that support inheritance of attributes and methods from other object classes. This avoids the need to have a one to one correlation of one signal for each data type. The illustrative embodiment allows a signal to represent multiple data types. Furthermore, the illustrative embodiment allows a block connected to such a signal to receive multiple data types, identify a desired data type therefrom and perform an operation using the desired data type. In this manner, if a user attempts to connect a signal representing two or more data types to a node or block that supports just one of the data types, the block executes although that block supports just one of the data types associated with the signal.

In one aspect of the present invention, a method is performed in an electronic device that provides a graphical model environment. The graphical model environment provides a first signal type for a first block and allows a user to define a second type that inherits from the first signal type. The second signal type is associated with a second block in the graphical model environment. The method allows a user to register the first signal type and the second signal type with a registry of the graphical model environment. Use of the registry allows the blocks in the graphical model environment to understand that signal types representing more than one defined class are derived from one or more common class definitions.

The method allows for implementation of the first signal type and the second signal type as objects with each signal type representing a defined class having attributes and methods. Likewise, each signal type is implementing able as a data structure having one or more attributes and a procedure structure having one or more methods.

In another aspect of the present invention, a method is performed in a graphical model programming environment for developing and performing functions. By providing a first object class that represents a first signal type the method allows a user of the programming environment to define a second object class that inherits from the first object class in the graphical modeling programming environment. The method allows instantiating an object of the second object class in representing a second signal type in the graphical model environment.

The method also includes steps of defining a third object class in the graphical model environment that inherits selected features from the first object class and instantiating an object of the third object class in representing a third signal type in the graphical model environment. The method includes steps of extending the second object class to include one or more features distinct from the features of the first object class and instantiating an object of the extended second object class in representing a fourth signal type in the graphical model environment.

In a further aspect of the present invention, a method is performed in an electronic device that provides a graphical model environment. The graphical model environment provides two or more base classes, each of the base classes represents a signal type in the graphical model environment. The method defines a first sub-class that inherits from at least two of the base classes and instantiates an object of the first sub-class in representing a signal in the graphical model environment. The method allows for the instantiation of the object of the first sub-class to take place within a selected block in the graphical model environment or to take place outside of the selected block.

The method further includes steps of defining a second sub-class that inherits from at least two of the base classes, constraining one or more base class attributes in defining the second sub-class and instantiating an object of the second sub-class in representing a signal in the graphical model environment. The method allows for extending or adding features of the base classes in defining the second sub-class.

In still another aspect of the present invention, a method is carried out in an electronic device that provides a graphical model environment. The graphical model environment provides a first block that outputs an instance of a first object class. The instance represents a first signal type in the graphical model environment. By propagating the instance of the first object class from the first block to a second block in the graphical model environment the second block processes a feature of the first object class. The second block propagates as an output an instance of a second object class that inherits from the first object class. The instance of the second object class represents a second signal type in the graphical model environment. The method further provides a step of propagating from an output of the second block an instance of a third object class that inherits from the first object class and adds other features. The instance of the third object class represents a third signal type in the graphical model environment.

The method includes steps of propagating an instance of the second object class from an output of the second block to a third block in the graphical model environment, the instance of the second object class is represented by the second signal type. In the third block, the block processes a feature of the second object class inherited from the first object class. The method is capable of carrying out steps of processing the instance of the second object class in the third block to separate features inherited from the first object class and propagating from an output of the third block an instance of the first object class in representing the first signal type in the graphical model environment.

The method is further capable of defining a third object class that inherits from the first and second object classes and instantiating an object of the third object class in a third block of the graphical model environment in representing a third signal type. Furthermore, the method is capable of carrying out steps of defining an interface block in the graphical model programming environment and receiving at an input of the interface block a signal type representing an instance of the second object class. In the interface block the instance of the second object class is decapsulated to produce at a first output of the interface block a signal type representing an instance of the first object class and produce at a second output of the interface block a signal type representing an instance of the second object class.

The method is further capable of carrying out steps of defining a desired block in the graphical model environment. The desired block receives at a first input a signal type representing an instance of the first object class and receives at a second input a signal type representing an instance of the second object class. The method allows for instantiation of an object of a third object class in the desired block. The to third object class can inherit from the first and second object class. The third object is represented as a third signal type in the graphical model environment and propagates from an output of the desired block.

In one aspect of the present invention, a device readable medium holding device executable instructions for performing a method in a graphical modeling environment is provided. The method allows for defining a first signal type for a first block in a graphical modeling environment and for defining a second signal type that inherits from the first signal type. The second signal type is associated with a second block in the graphical modeling environment. The method provides a step of saving the first signal type and the second signal type in a memory location accessible to the graphical modeling environment.

In a further aspect of the present invention, a device readable medium holding device executable instructions for performing a method in a graphical modeling environment is provided. The method includes instructions for creating a first object class that represents a first signal type and creating a second object class that inherits from the first object class. Instructions are included for instantiating an object of the second object class in representing a second signal type in the graphical modeling environment. Other device executable instructions create a third object class that inherits selected features from the first object class and instantiates an object of the third object class in representing a third signal type in the graphical model.

The device executable instructions for performing the method further define a fourth object class by extending the second object class to include one or more features distinct from features of the first object class and instantiates an object of the fourth object class in representing a fourth signal type in the graphical model.

In another aspect of the present invention, a device readable medium holding device executable instructions for performing a method in a graphical modeling environment is provided. Execution of the instructions defines two or more base object classes each of the base object classes represents a signal type in the graphical model environment. Execution of the instructions further defines a first object sub-class that inherits from at least two of the base object classes and instantiates an object of the first object sub-class in representing a signal type in the graphical model environment. Execution of the instructions can further define a second object sub-class that inherits from at least two of the base object classes and constrains one or more base class attributes in defining the second object sub-class. The executed instructions can instantiate an object of the second object sub-class in representing a signal type in the graphical modeling environment.

In a further aspect of the present invention, a device readable medium holding device executable instructions for performing a method in a graphical modeling environment is provided. Execution of the instructions provides a first block that outputs an instance of a first object class in representing a first signal type. The instance of the first object class is communicated from the first block to a second block in the graphical modeling programming environment where the second block processes a feature of the first object class and outputs and instance of a second object class that inherits from the first object class. The instance of the second object class represents a second signal type in the graphical modeling environment.

The method includes a step of communicating from an output of the second block, an instance of a third object class that inherits from the first object class and adds other features. The instance of the third object class represents a third signal type in the graphical modeling environment.

BRIEF DESCRIPTION OF FIGURES

In the illustrative embodiment of the present invention will be described below relative to the following drawings.

DETAILED DESCRIPTION

The illustrative embodiment of the present invention facilitates inheritance of attributes, methods, or both among signals in a graphical model environment. The method of the illustrative embodiment allows a programmer in the graphical model environment to associate or combine a first signal having a first set of characteristics understood by a first block with a second signal having a second set of characteristics understood by a second block in the graphical model environment. That is, for example, a source block of such a signal writes data to the signal in a first format and the destination block of the signal reads data from the signal in a second format. The method of the illustrative embodiment of the present invention allows extension of signal types to include characteristics of other signal types in a graphical model environment to facilitate creation of executable programs by adding additional capability to such signals. In this manner, creation or modification of blocks in the graphical model environment is possible to support and propagate signals having multiple sets of characteristics without the need to separate, split or otherwise create distinct signals for each set of characteristics.

Before continuing the discussion below, it is helpful to clarify the meaning of the term signal. A signal is used herein as used for Simulink®. Specifically, signals represent systems of values. A signal type refers to the internal representation of a signal.

It is further helpful to define the term "class" as used herein. A class defines a set of attributes and methods that characterize any member of the class, for example, an object. A class can have one or more sub-classes, or child classes, that can inherit all or some of the characteristics of the class. In relation to each sub-class or child class, the class becomes the super class or parent class. Moreover, a sub-class can define its own characteristics that are not part of the super class.

Figure 1:
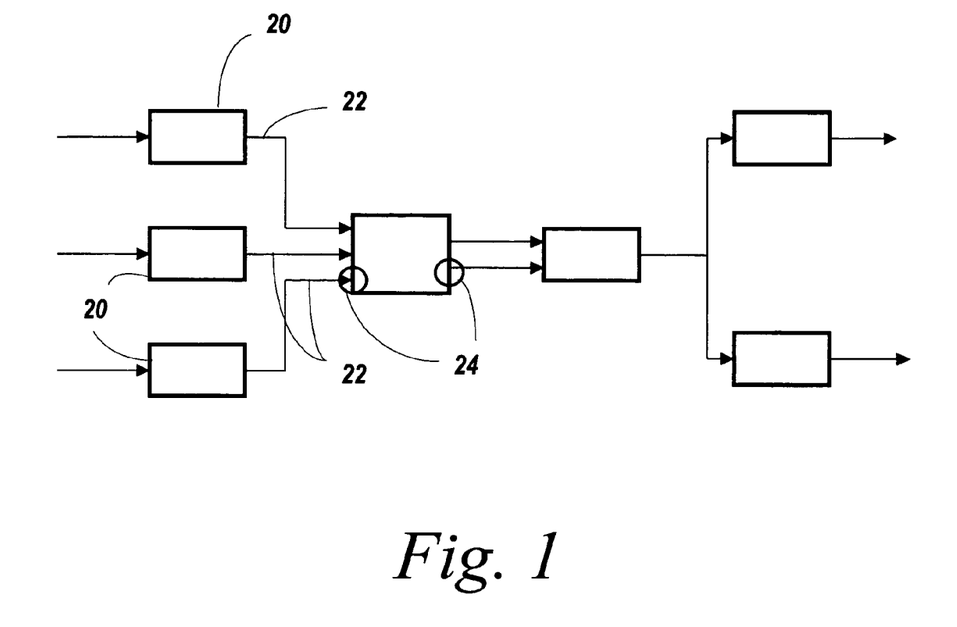
FIG. 1 illustrates components of an exemplary graphical model environment.

A graphical model of a dynamic system is represented schematically as a collection of blocks interconnected by lines that are either visible on a display, by lines that are not visually displayed, or both. The lines represent the connection as opposed to the signals themselves. Each block represents an elemental dynamic system. A line emanating at one block and terminating at another signifies that the output of the first block is an input to the second block. Each distinct input or output on a block is referred to as a port. Signals correspond to the time-varying quantities represented by each line connection and are assumed to have values at each time instant. The source block of a signal writes to the signal at a given time instant when its system equations are solved. The destination blocks of this signal read from the signal when their system equations are being solved. FIG. 1 illustrates exemplary components of a graphical model in a graphical modeling environment. The graphical model includes a plurality of blocks 20, signals 22 and ports 24 that are interconnected. Those skilled in the art will recognize that the term "blocks" does not refer exclusively to elemental dynamic systems but may also include other modeling elements that aid in readability and modularity of graphical models.

The generation or creation of the graphical model illustrated in FIG. 1 is accomplished, for example, using GUI tools in Simulink®. The suite of tools allows users to draft a graphical model on one or more corresponding windows. The GUI tools can include a block palette, wiring line connection tool (i.e. signal connector tool), annotation tool, formatting tool, attribute editing tool, save/load tool and publishing tool, and other tools depending on a user's need and the graphical modeling environment. The block palette is a library of predefined blocks available to the user when building or editing a graphical model. Individual users may be able to customize this palette to: (a) reorganize blocks in some custom format, (b) delete blocks they do not use, and (c) add custom blocks they have designed. The palette allows blocks to be dragged through some human-machine interface (such as a mouse or keyboard) from the palette on to the window (i.e., model canvas). The graphical version of the block that is rendered on the canvas is called the icon for the block. There may be different embodiments for the block palette including a tree-based browser view of all of the blocks.

The wiring line connection tool allows users to draw directed lines representing a signal that connect the ports of blocks in the model's window. Lines may also be added through various mechanisms involving human-machine interfaces such as a mouse or a keyboard. Simulink® also provides various forms of auto-connection tools that connect blocks automatically on user request to produce an aesthetically pleasing layout of the graphical model (especially those with high complexity with large numbers of blocks). The annotation tool allows users to add notes and annotations to various parts of the palette for a graphical model. The formatting tool enables users to perform various formatting operations that are generally available on any document editing tool. These operations help pick and modify the various graphical attributes of the graphical model (and constituent blocks) such as include font-selection, alignment & justification, color selection, etc. The graphical model and all the blocks within the graphical model generally have a set of functional attributes that are relevant for the execution or code-generation. The attribute editing tool provides GUIs that allows these attributes to be specified and edited. The save/load tool allows a created graphical model to be saved. The saved model can be reopened in the editor at some later juncture through a load mechanism. Simulink® also allows users to save blocks including pre-constructed subsystems into a separate class of block-diagrams called libraries. Such libraries facilitate reuse of the same block in a number of other block-diagrams. The load/save mechanism is specially equipped to handle loading and saving of blocks in a block-diagram that actually reside in libraries.

A typical base data-structure for a block may be represented as:

```
class Block {
public:
    // Access methods for setting/getting block data
    ...
    // Methods for block editing
    virtual ErrorStatus BlockDrawIcon( );
    virtual BlockParameterData BlockGetParameterData( );
    ...
    // Methods for block compilation
    ...
    If Methods for block execution
    ...........................................
        virtual ErrorStatus BlockOutput( ) = 0;
        virtual ErrorStatus BlockDerivative( ) = 0;
        virtual ErrorStatus BlockUpdate( ) = 0;
    ...
private:
    BlockGraphicalData blkGraphicalAttributes;
    BlockFunctionalData blkFunctionalAttributes;
    BlockCompiledData blkCompiledAttributes;
    BlockExecutionData blkExecutionData;
    ...
};
```

Although the example of the data structure above is written in C++, those skilled in the art will recognize that equivalent data structures written in other languages, such as a structured language or another object oriented language may also be used. The major data fields of the block data structure fall into four categories. For example, a graphical attributes field, a functional attributes field, a compiled attributes field and an execution data field.

The graphical attributes field is responsible for storing information relevant for graphical rendering of the block within its parent graphical model's GUI. Attributes specific to the block icon such as font, color, name, and icon-image are stored in this field. It should be noted that modifying these attributes does not affect the dynamics of the model using this block. The functional attributes field is responsible for to specifying block attributes that may potentially affect the dynamics of the model using this block. These attributes are specified for the block as a whole and the input and output ports of the block. Examples of block attributes include block sample times and restrictive flags. Block sample times specify if the block corresponds to an elemental, continuous, discrete, or hybrid dynamic system. If the block is an elemental discrete-time system, then the attribute specifies the spacing between time instants at which the block response should be traced. A restrictive flag disallows the use of blocks in certain modeling contexts. For example, one may impose the restriction that there may only be one instance of given block in a model.

Attributes of block ports specify properties of the information that is either available to or produced at that port. Block port attributes include dimensions, data types, sample rates, and direct feed through. Dimension attributes are individual dimensions of a multi-dimensional matrix that is used as a container for data elements. Data type attributes are the data type of each element of data in the data container. A complexity attribute is a flag to specify if each data element is real or complex. A sample rate attribute specifies how and when the signal corresponding to an input or output port will be used. The port sample times may sometimes be used to implicitly infer the block's sample time. The direct feed through attribute is specified only for input ports and indicates whether the Output, the GetTimeOfNextHit, or both equations of the block are a function of the given input. This attribute helps in determining the sequence in which block methods should be executed while executing the graphical model.

The compiled attributes field of the block data structure holds the attributes of the block and its ports that mirror the functional attributes listed above. This field is filled in during graphical model compilation by utilizing the functional attributes of the block in conjunction with the functional and compiled attributes of the blocks that are connected to it. This process of determining the compiled attributes from the functional attributes is termed attribute propagation or signal propagation. Attribute propagation is described in greater detail below in the section on graphical model compilation. The execution data field is mainly responsible for storing the memory locations that are going to serve as sources for block inputs, outputs, states, parameters, and other work areas during execution of blocks.

The block data structure also has a set of associated methods that may be categorized as access methods to data fields, methods used in editing, methods used in compilation and methods used in execution. Access methods to data fields help in setting and getting the various data fields of the block. Methods used in editing are called by the graphical model editor in order to render the block appropriately in the GUI of its parent graphical model. For instance, this set of methods may include a BlockDrawIcon method that determines the shape the block icon has on the GUI. Methods used in compilation are methods that are called by the graphical model compilation engine. They help validate the connections of the block to other blocks on the graphical model. The methods used in execution include a number of different run-time methods that are required for execution. These include the BlockOutput, BlockUpdate, BlockDerivative methods that realize the Output, Update, and Derivative equations often found in the context of dynamic systems. In addition, to these methods Simulink® includes several other run-time methods, such as the Jacobian, Projection, ZeroCrossings, Enable, Disable, Initialize, EvalParams (check and process parameters), and GetTimeOfNextHit methods. It should be noted that there is no explicit method for algebraic equations because these are represented and processed in a different manner.

Once a graphical model has been constructed using the editor, an execution engine allows the model to be solved in order to trace the system outputs as a function of time. The solution of the model, which may be referred to as model execution, is carried out over a user-specified time span for a set of user-specified inputs. Simulation proceeds in four major stages: compilation, link, code generation, and the simulation loop. Alternatively, the execution engine can obtain a linear representation of the model (linearization).

Figure 2:
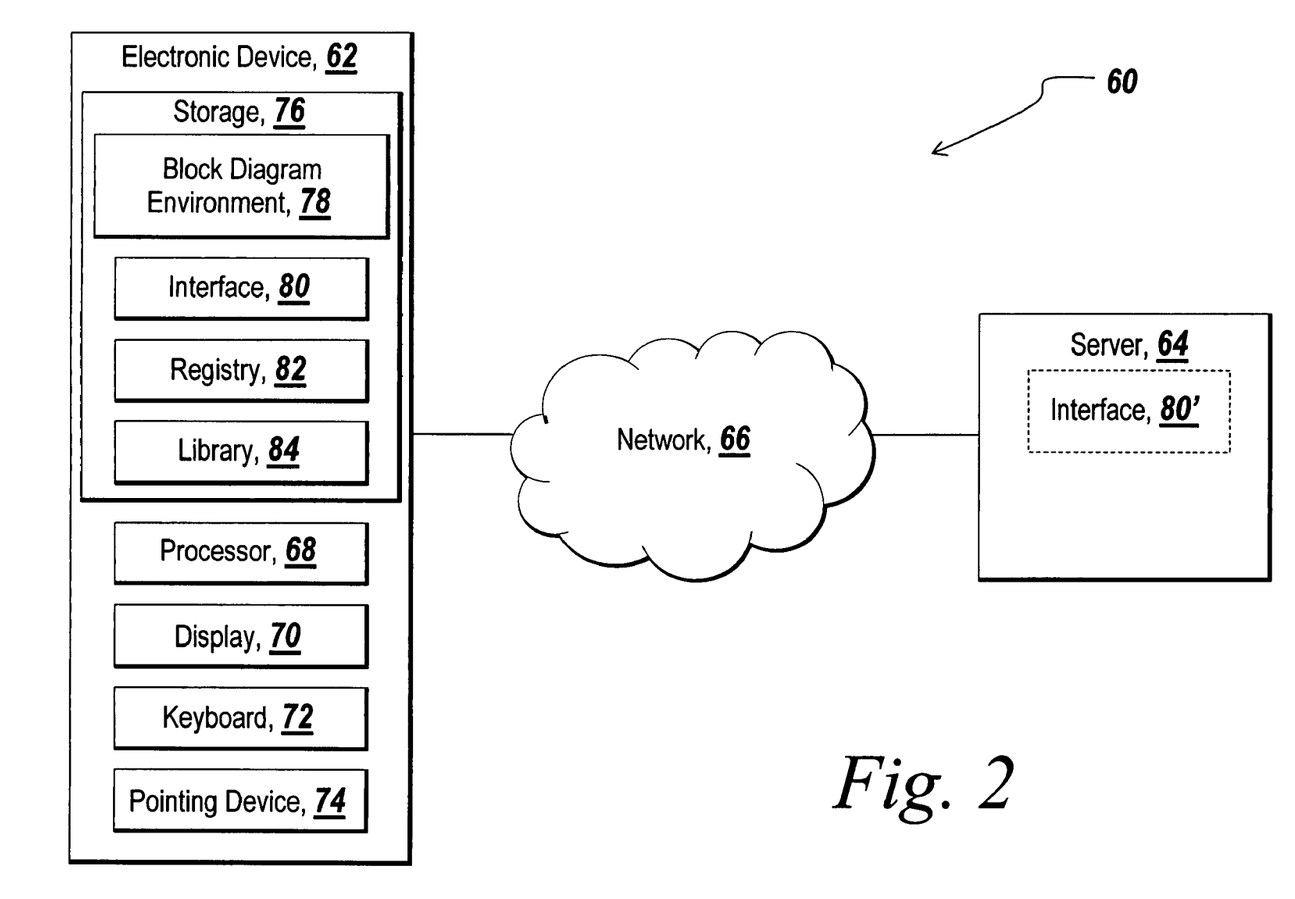
FIG. 2 is an exemplary graphical model illustrating an environment suitable for practicing the illustrative embodiment of the present invention.

FIG. 2 illustrates an environment suitable for practicing an illustrative embodiment of the present invention. A computer system 60 includes an electronic device 62, a network 66, such as the Internet, an intranet, or other suitable network either wired, wireless or a hybrid of wired and wireless, and, optionally, a server 64 or other electronic device. The electronic device 62 includes a microprocessor 68 for executing various instructions from an executable program and controlling various hardware and software components, a display device 70 for use in rendering textual and graphical images, a storage device 76 for storing various items such as a registry 82, a library 84, an interface 80 and a graphical model environment 78.

The library 84 is a repository of blocks that currently exist in the graphical model environment 78. The registry 82 in conjunction with the interface 80 allows a user to register with the graphical model environment 78 signals that represent more than one set of characteristics, for example signals representing more than one defined signal class. Those skilled in the art will appreciate that the illustration of the interface 80, the registry 82, and the library 84 is merely illustrative and these elements can be physically or logically located in the graphical model environment 78.

The electronic device 62 also includes a keyboard 72 and a pointing device 74, such as a mouse, trackball or lightpen. The graphical model environment 78 will be described below for illustrative purposes based on Simulink® from The MathWorks, Inc. of Natick, Mass. Nevertheless, those skilled in the art will appreciate that the principles and concepts described below are equally applicable to other graphical modeling environments, such as LabView, System View, Signal Processing Workstation, HyperSignal, COSSAP, Angeles, Ptolemy and other like graphical model environments.

The interface 80 programmatically registers the various signal classes defined by a user with the registry 82 and thus the graphical model environment 78. The interface 80 advantageously allows registration of signal class extensions along with new signal classes with the graphical model environment 78 without making it necessary for blocks, for example, blocks in the library 84 that do not support the extended signal classes (i.e. extended signal types) to modify their code or operation or to have any knowledge of the extended portion of the signal class except that the signal class is derived from one or more signal super classes or signal parent classes.

Definitions of signal classes, and hence a complete signal class inheritance hierarchy, may be accomplished explicitly in the context of the graphical model environment by use of a registry or other means to retain class definition declarations. Alternatively, the definitions are declarable and retained in a separate environment that is equipped with interfaces to access the definitions directly from the graphical model environment. MATLAB® is an example of an environment in which signal class definitions may be declared and instanced by means of a textual description language and a suitable type repository. Nonetheless, those skilled in the art will recognize that other programming applications and environments are well suited to act as a repository or define a signal class hierarchy even if interfaces need to be defined and developed to share class definitions and object instances with the illustrative graphical model environment 78. Furthermore, those skilled in the art will recognize that the interface 80 can take the form of a graphical user interface that provides a user of the system 60 with textual and graphical information to allow the user to browse, select, create, and modify the signal classes and the signal sub-classes of the graphical model environment 78. Those skilled in the art will appreciate that the interface 80 is also implementable as a command line interface or other suitable interface that allows a user to register a newly defined signal class or signal sub-class (i.e. newly defined signal type) with the graphical model environment 78.

The server 64 coupled to the network 66 is adaptable to include the interface 80'. In this manner, a number of users are able to access the interface 80' via the network 66 to establish a central registry of signals and their associated signal classes and signal sub-classes that represent more than one signal type. Those skilled in the art will recognize that the electronic device 62 includes other software such as other interfaces and other programs, such as one or more OS programs, compilers and various other program applications developed in a variety of programming environments for controlling system software and hardware components.

The illustrative embodiment may adopt an object oriented (OO) programming model. In an object oriented programming environment an object is a software artifact that has attributes and behaviors. Behaviors are also referred to as functions or methods. Object classes are arranged in a hierarchy with a parent class located at a root of the hierarchy tree with sub-classes extending therefrom. Each sub-class or child class is derived from, and inherits attributes and methods from another class such as, a parent class. Thus, an instance of a sub-class is also an instance of its parent class.

In an object oriented programming environment inheritance is an act of transmission or receiving of characteristics. That is, inheritance is a mechanism whereby classes share similarities while preserving differences. There are various forms of inheritance and each conform to the basic idea of sharing common attributes between various classes while allowing realization of differences through extensions of the parent classes, such as child classes or sub-classes. An object that is an instance of a child class is also an instance of the parent class in the object class hierarchy. The object acquires operations, attributes, and associations from the parent class as well as the child class. Nevertheless, classes may or may not have instances. For example, abstract classes can not have instances while concrete classes can have instances. Furthermore, a child class can have more than one parent class and is therefore defined to have multiple inheritances. Although the illustrative embodiment of the present invention is discussed herein in accordance with the concepts and principles of classes in an object oriented framework those skilled in the art will recognize that the illustrative concepts discussed herein are applicable to other programming frameworks such as structured programming frameworks including C, Fortran and the like, or in hybrid programming frameworks having OO properties and structured properties such as C#.

Figure 3:
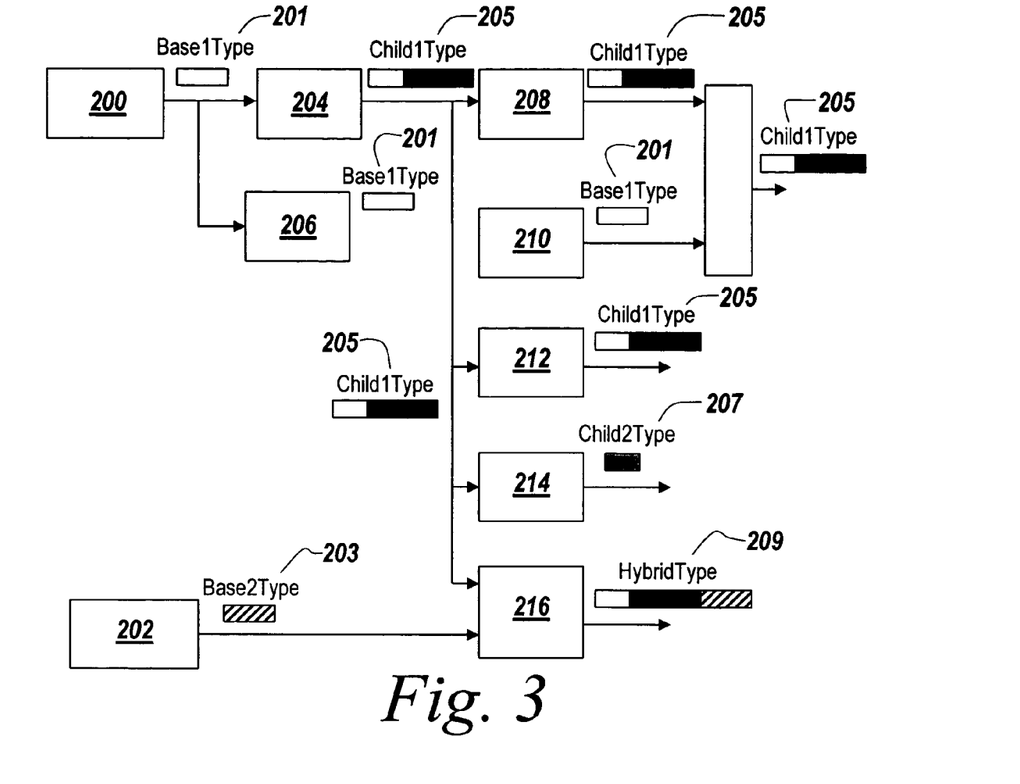
FIG. 3 is a block flow diagram illustrating signal propagation and signal inheritance in an exemplary graphical model environment.
Figure 4:
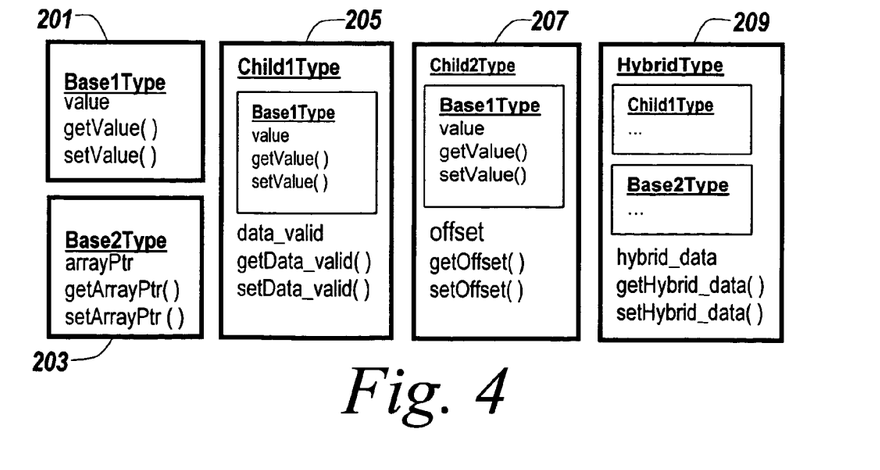
FIG. 4 illustrates more detail of the exemplary object classes illustrated in FIG. 3.

FIGS. 3 and 4 illustrate the principle of a signal representing more than one signal type in the graphical model environment 78. In the illustrative embodiment of the present invention signals in the graphical model environment 78 are objects belonging to one or more classes. For example, the classes illustrated in FIG. 6. Class 201 is a parent class of a Base1 signal or a Base1 signal type containing attributes and operations. Instantiation of an object of the Class 201 represents a signal type, for example, an unsigned 8 bit integer signal type that includes an attribute "value" and operations defined for reading and writing the value. Another exemplary parent class of a signal type is Class 203 for a Base2 or a Base2 signal type containing attributes and operations. Instantiation of an object of the Class 203 represents a Base2 signal type in the graphical model environment 78. The Base2 signal type includes attributes and operations, such as the attribute array pointer and operations get array pointer, and set array pointer.

Illustrated Class 205 and Class 207 are each child classes that inherit attributes and operations from Class 201. Instantiation of an object of the Class 205 represents a Child1 signal type in the graphical model environment 78, such an object includes attributes and operations of the Class 201 and extends or adds additional attributes and operations, for example, an attribute "data_valid". In like fashion, instantiation of an object of the Class 207 represents a Child2 signal type in the graphical model environment 78. The Child2 signal type includes attributes and operations of the Class 201 and extends those attributes and operations to include, for example, an "offset" attribute and additional reading and writing operations. A defined Class 209 illustrates multiple inheritances in the graphical model environment 78. Class 209 inherits attributes and operations from Class 205 and Class 203 and further extends the inherited attributes and operations to include additional attributes and operations. Nevertheless, those skilled in the art will recognize that extensions to the inherited operations and attributes are optional and the definition of a class that inherits from another class can place restrictions on inherited attributes and operations. Instantiation of an object of the Class 209 represents a Hybrid signal type in the graphical model environment 78.

FIG. 3 illustrates how various blocks in the graphical model environment 78 support and propagate signals that represent more than one class or signal type. In the exemplary graphical model depicted in FIG. 3, block 200 is a source block that generates an object that is an instance of Class 201 and is represented as a Base1 signal type. In the exemplary graph, blocks 206, 208 and 210 are adapted to support Base1 signal types. Thus blocks 206, 208, and 210 are each able to receive as input a Base1 signal type or a signal type derived from the class represented by the Base1 signal type. For example, a child signal type representing an object of a sub-class, for example, Class 205, 207 or 209 and still carry out a predefined operation on a signal type derived from a parent signal class because the received signal type represents a signal sub-class derived a parent signal class (i.e. Class 201) that the blocks 206, 208, and 210 understand and know how to operate on. Blocks 206, 208 and 210 are adapted to process one or more features of the received Base1 signal type depending on the various attributes of the block, as discussed above. Blocks 206, 208, and 210 can either pass to their outputs a signal type representing an object of the Class 205 a signal type representing an object of the Class 207, or a signal type representing an object of the Class 201.

In similar fashion, blocks 204, 212, and 214 are adapted to receive and process one or more signal types that represent an object of the Class 205, an object of the Class 207, or an object of the Class 201 and pass to an output a signal type representing an object of the Class 205, or a signal type representing an object of the Class 207. That is, block 204 extends the Class 201 represented by the Base1 signal type to propagate a Child1 signal type representing an object of the Class 205, which is a sub-class of Class 201 represented by a Base1 signal type. In similar fashion, the block 214 receives as an input a Child1 signal type representing an object of the Class 205. Block 214 restricts a portion of the attributes and operations defined in the Class 205, and extends the attributes and operations of the Class 205 to match those defined in Class 207. Block 214 instantiates an object of the Class 207 and propagates at an output a Child2 signal type in representing the object of the Class 207.

Block 202 is a source block of a Base2 signal type representing an object of the Class 203. Block 216 receives as input a Base2 signal type and a Child1 signal type representing an object of the Class 205. Block 216 is adapted to support and allow multiple inheritance and extension of inherited attributes and operations. Block 216 outputs a Hybrid signal type that represents an object of a class that inherits from Class 203 and 205, and extends the inherited attributes and operations. In similar fashion, Block 210 is a source block of a Base1 signal type that represents an object of the Class 101. Block 218 receives as input the Child1 signal type representing an object of the Class 205 and the Base1 signal type. Block 218 is adapted to perform operations on each received-signal type and output a Child1 signal representing an object of the Class 205.

The present invention advantageously allows implementation of signals as objects or other data structures whose attributes are interpreted differently based on processing requirements of a block in a graphical model environment. As such, each block in the environment can propagate a received signal type with its associated attributes and operations unchanged, carry out one or more operations on the received signal type based on a class hierarchy associated with the signal type, extend the attributes and operations of the signal type to form a signal type representing another class, or restrict or override attributes and operations of the parent class represented by the received signal to output a signal type different from the received signal type. To accomplish these benefits the interface 80 operates in conjunction with the graphical model environment 78 to assist in the management and interpretation of the objects representing signals. The interface 80 allows registration of class definitions with the registry 82 without making it necessary for blocks that do not support signals representing an object of an extended class or sub-class to modify the code or operation, or to have any knowledge of the extended class represented by the signal type except for the base class or parent class definition.

In this manner, the graphical model environment 78 can interface with another graphical model environment having a proprietary data format or other data format not typically supported in the graphical model environment 78 without the need to create a customized library of blocks such as gateway blocks to transform the proprietary data format from one understandable by the proprietary graphical model environment to one understandable by the graphical model environment 78. Hence, registration of a definition of the proprietary data format with the registry 82 allows the graphical model environment 78 to use features and characteristics specific to the proprietary environment without need to modify or create blocks in the graphical model environment 78 to specifically translate between formats. Accordingly, the graphical model environment 78 executes and interfaces with the proprietary graphical model environment since all blocks would interchange signals representing an object of a class or an object of a sub-class having attributes and operations registered with the graphical model environment 78. Hence, signal types representing an object of a class or an object of a cub-class having attributes and operations understandable by each graphical model environment are propagated therebetween.

Figure 5:
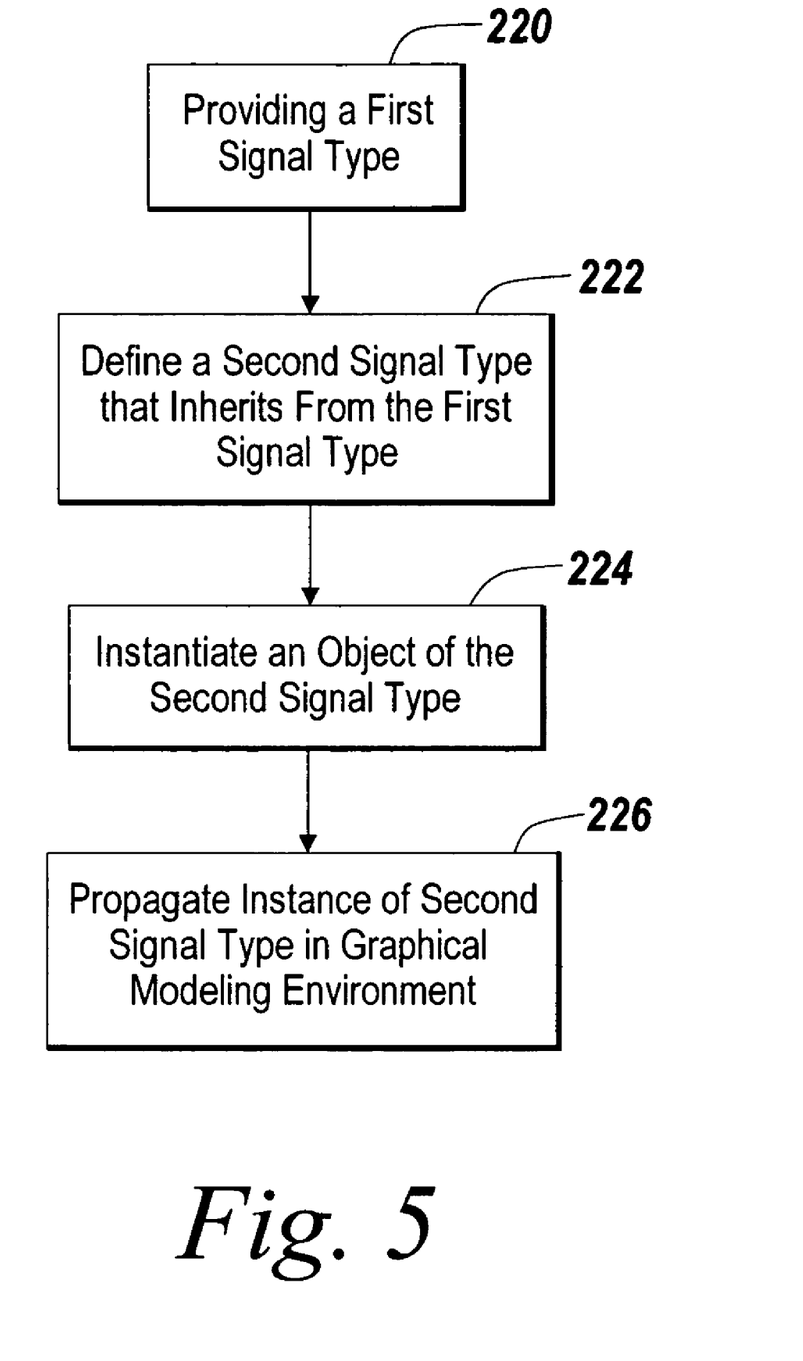
FIG. 5 is an exemplary flowchart that provides an overview of steps taken to practice the illustrative embodiment of the present invention.

FIG. 5 illustrates an exemplary flowchart depicting steps taken to practice the illustrative embodiment of the present invention. Upon initialization of the graphical model environment 78 a first signal type representing an object of a class is provided to a user of the electronic device 62 (step 220). The user of the electronic device 62 using the keyboard 72, the pointing device 74, or both, defines a second signal type representing an object of a second class or sub-class that inherits from the first signal type (step 222). The user via the electronic device instantiates an object of the newly defined class to represent the second signal type (step 224). Using the pointing device 74 the user couples the second signal type from an output of a first block to an input of a second block to allow the graphical model environment 78 to propagate the second signal type (step 226).

Figure 6:
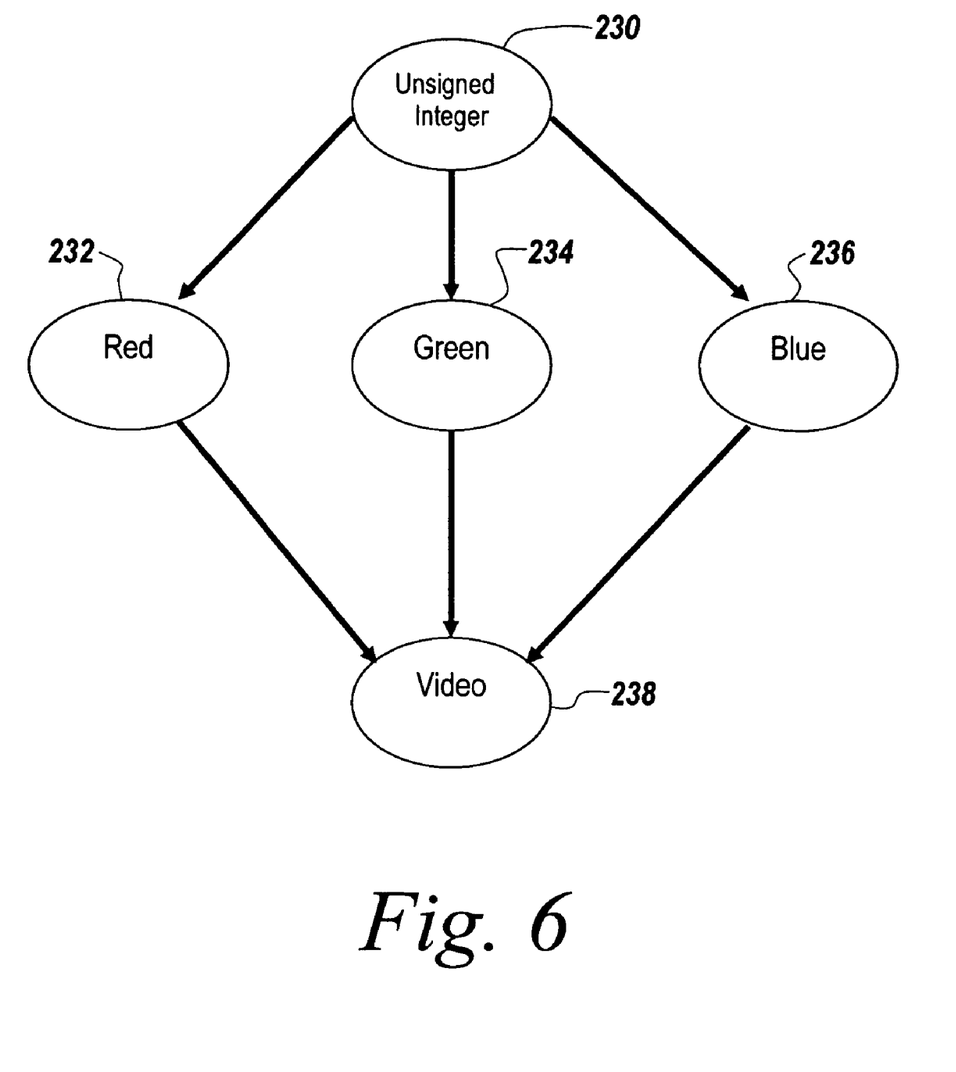
FIG. 6 is an illustrative inheritance diagram suitable for use in practicing the illustrative embodiment of the present invention.

FIG. 6 illustrates an exemplary signal inheritance diagram illustrating one application of the illustrative embodiment of the present invention. A color video signal 238 is formed from a red signal 232, a green signal 234, and a blue signal 236, with each signal inherits the attribute "unsigned integer" from the signal 230 representing a parent class. The color video signal 238 is formed in a block of the graphical model environment 78 by combining the signals 232, 234, and 236, and as such, the video signal 238 inherits the attribute "unsigned integer" from the signal 230. Accordingly, a block defined to carry out an operation on the unsigned integer signal 230 is able to receive the video signal 238 as an input and perform the operation on the red signal 232 because the block is able to determine that the video signal 238 is derived from the red signal 232.

Figure 7:
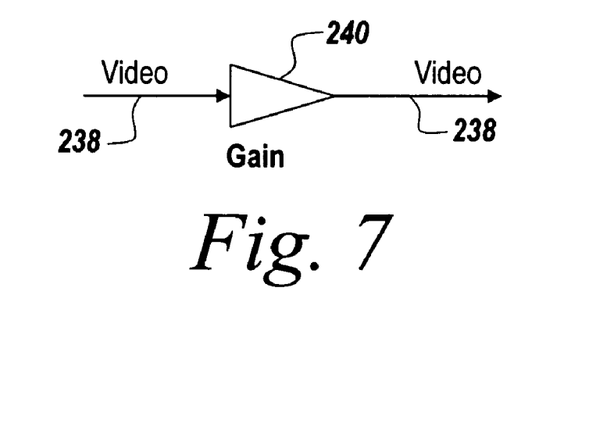
FIG. 7 is an illustrative representation of a block in a graphical modeling environment.

As an example, in FIG. 7, the video signal 238 is fed into a gain block 240. The gain block 2140 is not capable of processing a video signal 238, however, gain block 240 is adapted to multiply an "unsigned integer" which is an attribute of the signal 230 inherited by the signals 232, 234 and 236. Thus, the illustrative embodiment of the present invention allows existing blocks, such as gain block 240 that support attributes and operations of a parent class to process signal types representing objects formed or derived from the parent class without modification to the gain block 240. Accordingly, the gain block 240 multiplies each of the three values of the attribute "unsigned integer" forming the video signal 238 and propagates the video signal 238 at an output port.

Figure 8:
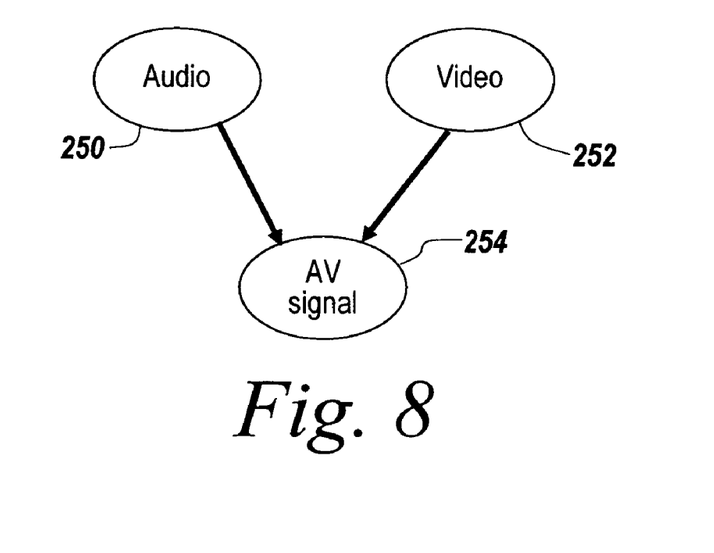
FIG. 8 illustrates a second inheritance diagram suitable for use in practicing the illustrative embodiment of the present invention.
Figure 9:
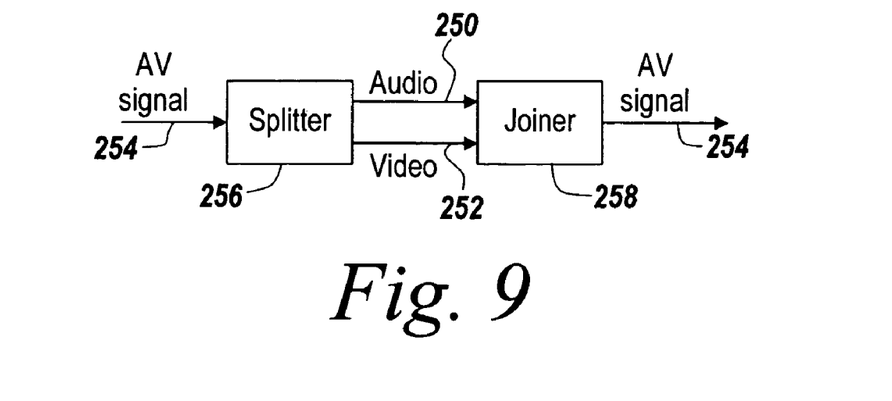
FIG. 9 is an exemplary graphical model represented schematically as a collection of blocks interconnected by lines that represent signals.

FIGS. 8 and 9 provide another example of the illustrative embodiment of the present invention. An audio signal 250 representing an object of an audio class and a video signal 252 representing an object of a video class are combined to form an audio/visual signal 254 representing an object that inherits attributes and operations of the audio class and the video class. Similarly when the audio/visual signal 254 is fed to a display block (not shown) the display block can read the attributes and operations of the video signal 252 forming the audio/visual signal 254 to render an image on the display 70 without the need to read or understand the attributes and operations of the audio signal 250 forming the audio/visual signal 254. To help facilitate interface of signals representing more than one signal type with blocks that lack ability to process such signals, an interface block such as splitter block 256 or joiner block 258 are implementable. The splitter block 256 is able to separate from the audio visual signal 254 the audio signal 250 and the video signal 252. The joiner block 258 is used to implement class inheritance and as such takes as inputs the audio signal 250 and the video signal 252 and creates an object of a class that inherits from the audio class and the video class and represents that object as the audio/visual signal 254. Those skilled in the art recognize that the joiner block 258 is capable of extending, restricting, or both the features of the class associated with any input signal.

Figure 10:
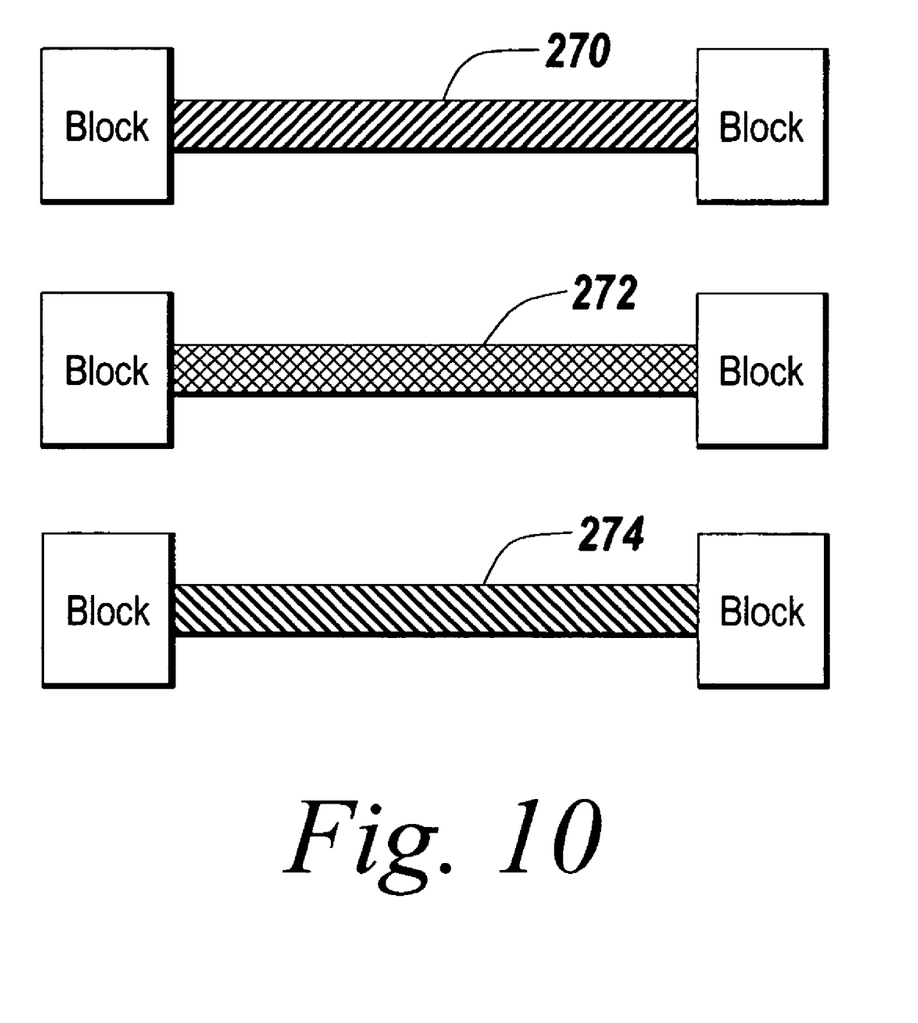
FIG. 10 illustrates graphical representations of signals suitable for use in practicing the present invention.

FIG. 10 illustrates a graphical representation of signals representing more than one signal type. Signal 270 is graphically rendered to indicate that signal 270 represents two signal types, for example a first signal type and a second signal type. Signal 272 is graphically rendered to indicate that signal 272 represents three signal types, for example a third signal type, a fourth signal type, and a fifth signal type. Nevertheless, those skilled in the art will recognize that signals 270 and 272 are capable of taking other graphical forms and shapes to indicate representation of a combination of other signal types, for example signal 270 is capable of taking a different representation when signal 270 represents a signal having characteristics of the first signal type and the third signal type. In this manner, a programmer or a user of the graphical model environment 78 can readily identify the characteristics of the signal. Nevertheless, those skilled in the art will recognize that the depiction of signals 270 and 272 is merely illustrative and can take any number of graphical shapes, colors, shadings, geometries and the like. For example, signals 270 and 272 are capable of being represented as one graphical form such as graphical form 274 representing a signal having characteristics of signal 270 and signal 272.

Figure 11:
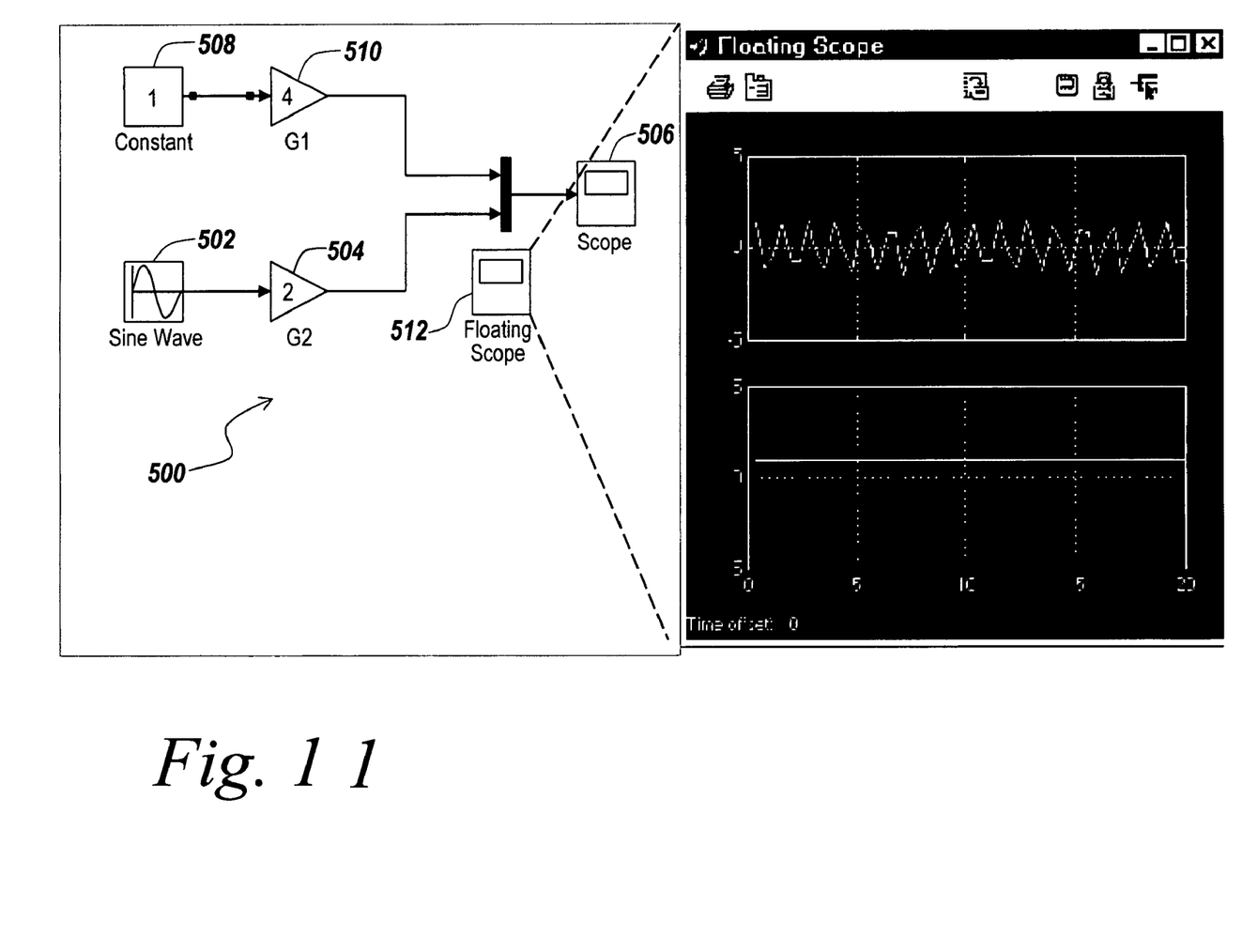
FIG. 11 illustrates a model using virtual connections or implied connections.

FIG. 11 illustrates a model 500 using virtual connections or implied connections (i.e. no graphically rendered lines or connections to a block in the graphical model, for example, floating scope block 512). Model 500 illustrates use of a floating scope block 512 capable of receiving a derived signal type so long as the floating scope block 512 is predefined to operate on a signal type from which the received signal is derived from.

Model 500 includes a constant block 508 coupled to a gain block 510. The constant block 508 feed the gain block 510 with a constant value for amplification. An output of the gain block 510 is coupled to scope block 506. The gain block 510 provides the scope block 506 with an amplified constant value, which, in turn graphically represents the amplified signal as an output. Sine wave block 502 is coupled to an input port of gain block 504. Sine wave block 502 produces a sine wave output that is fed to an input of gain block 504, which, in turn amplifies the received sine wave signal to output an amplified sine wave. The gain block 504 is coupled to a second input of the scope block 506.

The floating scope 512 represents a scope block capable of displaying signals carried on one or more lines in a model within the graphical model environment 78. Use of the floating scope 512 allows a user to select one or more signals from a model for graphical display by the floating scope 512 without the need to draw lines connecting the floating scope 512 to the source or sources of the signals a user wishes to graphically display on the floating scope 512. Use of the floating scope 512, or any other block capable of having virtual or implied connections allows a user to select one or more signals from the model and have the block with the virtual or implied connections perform one or more operations of the selected signals without having to graphically represent a connection between such a block and the selected signal or signals in the model.

In accordance with the illustrative embodiment of the present invention the floating scope 512 can receive a child signal type derived from a parent signal type on an implied or virtual connection and perform an operation on a portion of the child signal type without having any code or predefined operation that allows the floating scope 512 to operate on the derived portion of the received signal type. This is because the floating scope 512 has code or predefined operations that allow the floating scope 512 to operate on a parent signal type and can recognize that the child signal type is derived from the parent signal type, and therefore perform one or more operations using the attributes of the parent signal type. Nevertheless, the floating scope 512 can have code or predefined operations to operate on the derived portion of the child signal type.

While the present invention has been described with reference to an illustrative embodiment thereof, one skilled in the art will appreciate that there are changes in form and detail that may be made without departure from the intended scope of the present invention as defined in the pending claims. For example, the interface 80 can be implemented programmatically or implemented as a graphical user interface or as a command line interface or other like interface.

What is claimed is:

1. In an electronic device that provides a graphical modeling environment, a method comprising:
   providing a first signal type for a signal in the graphical modeling environment;
   defining a second signal type that inherits from the first signal type; and
   registering at least one of the first and second signal types with a registry of the graphical modeling environment.

2. The method of claim 1, wherein said first signal type is associated with a block in the graphical modeling environment.

3. The method of claim 2, wherein said second signal type is associated with the block in the graphical modeling environment.

4. The method of claim 2, wherein said second signal type is associated with another block in the graphical modeling environment.

5. The method of claim 1, further comprising:
   providing a block in the graphical modeling environment having a structure and operation for operating on the first signal type;
   receiving on an input node of the block a signal of the second signal type; and
   processing a portion of the received signal in the block.

6. The method of claim 5 wherein said input node comprises a graphically rendered port viewable by a use of said graphical modeling environment.

7. The method of claim 1, wherein at least one of a signal of said first signal type and a signal of said second signal type are visually depicted in the graphical modeling environment.

8. The method of claim 1, wherein defining further comprises:
   defining the second signal type using an interface to the graphical modeling environment.

9. The method of claim 1, wherein the definition of the second signal type is derived from one or more components of the graphical modeling environment.

10. The method of claim 5, wherein the portion of the received signal that is processed is derived from the first signal type.

11. The method of claim 5, further comprising:
    generating one or more signals of the first signal type using the block; and
    outputting the one or more signals of the first signal type from the block.

12. The method of claim 5, further comprising:
    generating one or more signals of the second signal type using the block; and
    outputting the one or more signals of the second signal type from the block.

13. The method of claim 5, further comprising:
    generating one or more signals of a third signal type using the block; and
    outputting the one or more signals of the third signal type from the block, wherein the third signal type has a definition defining a class distinct from a class of the first signal type and a class of the second signal type.

14. The method of claim 1, wherein the first signal type and the second signal type each have one or more attributes.

15. The method of claim 1, wherein the first signal type and the second signal type are each capable of including one or more methods.

16. The method of claim 1, further comprising:
    rendering on a display of the electronic device a first graphical form representing the first signal type and a second graphical form representing the second signal type.

17. The method of claim 1, further comprising:
    rendering on a display of the electronic device a first graphical form representing the first signal type and the second signal type.

18. The method of claim 1, wherein each signal type comprises a class.

19. The method of claim 1, wherein each signal type comprises, a data structure having one or more attributes, and a procedure structure having one or more methods.

20. The method of claim 1, further comprising:
    instantiating the signal of the first signal type in the graphical modeling environment; and
    restricting instantiation of a signal of the second signal type in the graphical modeling environment.

21. The method of claim 1, further comprising:
    instantiating the signal of the first signal type in the graphical modeling environment; and
    instantiating a signal of the second signal type in the graphical modeling environment.

22. The method of claim 1, wherein the registry includes a mechanism for use in describing the inheritance of the second signal type from the first signal type.

23. The method of claim 1, wherein defining further comprises:
    defining the second signal type using a mechanism of a programming environment distinct from the graphical modeling environment.

24. In a graphical modeling environment, a method comprising:
    providing a first object class that represents a first signal type;
    defining a second object class that inherits from the first object class; and
    instantiating an object of the second object class in representing a second signal type in the graphical modeling environment,
    wherein the graphical modeling environment comprises a programming environment for developing and performing scientific related functions.

25. The method of claim 24, further comprising:
    defining a third object class that inherits selected features from the first object class the third object class representing a third signal type in the graphical modeling environment.

26. The method of claim 25, further comprising:
    instantiating an object of the third object class in representing the third signal type in the graphical modeling environment.

27. The method of claim 24, further comprising:
extending the second object class to include one or more features distinct from features of the first object class in the graphical modeling environment.

28. The method of claim 27, further comprising:
instantiating an object of the extended second object class in representing a fourth signal type in the graphical modeling environment.

29. In an electronic device that provides a graphical modeling environment, a method comprising:
providing two or more base object classes, each of the base object classes representing a signal type;
defining a first object sub-class that inherits from at least two of the base object classes;
instantiating an object of the first object sub-class in representing a first signal in the graphical modeling environment;
defining a second object sub-class that inherits from at least two of the base object classes;
constraining one or more base class attributes in defining the second object sub-class; and
instantiating an object of the second object sub-class in representing a second signal in the graphical modeling environment.

30. The method of claim 29, wherein the instantiating of the object of the first object sub-class representing the first signal in the graphical modeling environment is performed in a selected block in the graphical modeling environment.

31. The method of claim 29 further comprising:
adding one or more features to the second object sub-class in defining the second object sub-class.

32. In an electronic device that provides a graphical modeling environment, a method comprising:
providing a first parent class that represents a first parent signal type;
providing a second parent class that represents a second parent signal type;
defining a first derived class that inherits from the first and the second parent signal class; and
instantiating an object of the first derived class representing a derived signal type in the graphical modeling environment.

33. The method of claim 32, wherein instantiating is performed in a selected block in the graphical modeling environment.

34. The method of claim 32, further comprising:
defining a second derived class that inherits from at least two of the parent classes; and
constraining one or more parent class attributes in defining the second derived class in the graphical modeling environment.

35. The method of claim 32, further comprising:
adding one or more features to the first derived class in defining the first derived class.

36. The method of claim 33, further comprising:
defining a second derived class that inherits from one of the first and second parent signal class; and
adding one or more features to the second derived class in defining the second derived class.

37. In an electronic device that provides a graphical modeling environment, a method comprising:
providing a first block that outputs an instance of a first object class that represents a first signal type;
propagating the instance of the first object class from the first block to a second block in the graphical modeling environment, the second block processing a feature of the first object class; and
propagating from an output of the second block an instance of a second object class that inherits from the first object class, wherein the instance of the second object class represents a second signal type in the graphical modeling environment.

38. The method of claim 32, wherein at least one of the first parent class or the second parent class are not visually depicted in the graphical modeling environment.

39. The method of claim 32, wherein at least one of the first parent class or the second parent class are programmatically defined in an environment distinct from the graphical modeling environment.

40. The method of claim 37, further comprising:
propagating from the output of the second block, an instance of a third object class that inherits from the first object class and adds other features, wherein the instance of the third object class represents a third signal type in the graphical modeling environment.

41. The method of claim 32, wherein at least one of the first parent class or the second parent class are programmatically defined in the graphical modeling environment.

42. The method of claim 32, wherein at least one of the first parent class or the second parent class are imported from an environment other than the graphical modeling environment.

43. The method of claim 37, further comprising:
propagating the instance of the second object class from the output of the second block to a third block in the graphical modeling environment, wherein the instance of the second object class representing the second signal type; and
in the third block, processing a feature of the first object class inherited by the second object class.

44. The method of claim 43, further comprising:
in the third block, processing the instance of the second object class to separate therefrom the features inherited from the first object class; and
propagating from an output of the third block an instance of the first object class in representing the first signal type in the graphical modeling environment.

45. The method of claim 43, further comprising:
defining a third object class that inherits from the first and second object classes; and
instantiating an object of the third object class in the third block in representing the third signal type in the graphical modeling environment.

46. The method of claim 37, further comprising:
defining a third block in the graphical modeling environment;
receiving at an input of the third block a signal type representing an instance of the second object class; and
in the third block, decomposing the instance of the second object class into one or more signal components, each signal component representing instances of an object class to produce signal types representing instances of the component object classes output from the third block.

47. The method of claim 46, further comprising:
in the third block, decomposing the instance of the second object class to produce a signal type representing an instance of the first object class at a first output of the third block and produce a signal type representing an instance of the second object class at a second output of the third block.

48. The method of claim 37, further comprising:
defining a fourth block in the graphical modeling environment;

receiving at a first input of the fourth block a signal type representing an instance of the first object class;

receiving at a second input of the fourth block a signal type representing an instance of the second object class;

in the fourth block, instantiating an object of a third object class that inherits from the first and second object classes; and representing an instance of the object of the third object class as a third signal type propagating from an output of the fourth block.

49. A device readable storage medium holding device executable instructions for performing a method in a graphical modeling environment, the method comprising:

defining a first signal type in the graphical modeling environment;

defining a second signal type that inherits from the first signal type, wherein said second signal type is programmatically defined in the graphical modeling environment; and rendering on a display of an electronic device a first graphical form representing the first signal type and a second graphical from representing the second signal type.

50. The medium of claim 49, wherein the method further comprises:

saving at least one of the first and second signal types in a memory location accessible to the graphical modeling environment.

51. The medium of claim 49, wherein the first signal type and the second signal type each have one or more attributes.

52. The medium of claim 49, wherein the first signal type and the second signal type are each capable of including one or more methods.

53. The medium of claim 49, wherein each signal type comprises an object class.

54. The medium of claim 49, wherein each signal type comprises, a data structure having one or more attributes, each of the attributes are interpreted by each block in the graphical modeling environment based on a processing requirement of the block.

55. The medium of claim 50, wherein each signal type comprises, a data structure having one or more methods, each of the methods being used by each block in the graphical modeling environment based on the processing requirement of the block.

56. A device readable storage medium holding device executable instructions for performing a method in a graphical modeling environment, the method comprising:

creating a first class that represents a first signal type;

creating a second class that inherits from the first class;

instantiating an object of the second class in representing a second signal type in the graphical modeling environment;

creating a third class that inherits selected features from the first class; and instantiating an object of the third class in representing a third signal type in the graphical modeling environment.

57. The medium of claim 56, wherein the method further comprises:

defining a fourth class to extend the second class; and instantiating an object of the fourth class representing a fourth signal type in the graphical modeling environment.

58. A device readable storage medium holding device executable instructions for performing a method in a graphical modeling environment, the method comprising:

defining two or more base object classes, each of the base object classes representing a signal type in the graphical modeling environment;

defining a first object sub-class that inherits from at least two of the base object classes;

instantiating an object of the first object sub-class in representing a signal type in the graphical modeling environment;

defining a second object sub-class that inherits from at least two of the base object classes; and constraining one or more base class attributes in defining the second object sub-class.

59. The medium of claim 58, wherein the instantiating of the object of the first object sub-class representing the signal in the graphical modeling environment is performed in a selected block in the graphical modeling environment.

60. The medium of claim 58, wherein the method further comprises:

instantiating an object of the second object sub-class in representing a signal type in the graphical modeling environment.

61. The medium of claim 58, wherein the method further comprises:

adding one or more features to the second object sub-class in defining the second object sub-class.

62. A device readable storage medium holding device executable instructions for performing a method in a graphical modeling environment, the method comprising:

providing a first block that outputs an instance of a first object class that represents a first signal type:

communicating the instance of the first object class from the first block to a second block in the graphical modeling environment, the second block processing a feature of the first object class; and in the second block, outputting an instance of a second object class that inherits from the first object class, wherein the instance of the second object class represents a second signal type in the graphical modeling environment.

63. The medium of claim 62, wherein the method further comprises:

communicating from an output of the second block, an instance of a third object class that inherits from the first object class and adds other features, wherein the instance of the third object class represents a third signal type in the graphical modeling environment.

64. The medium of claim 62, wherein the method further comprises:

communicating an instance of the second object class from an output of the second block to a third block in the graphical modeling environment, wherein the instance of the second object class represents the second signal type; and in the third block, processing a feature of the first object class inherited by the second object class.

65. The medium of claim 64, wherein the method further comprises:

in the third block, processing the instance of the second object class to separate therefrom the features inherited from the first object class; and communicating from an output of the third block an instance of the first object class in representing the first signal type in the graphical modeling environment.

66. The medium of claim 64, wherein the method further comprises:

defining a third object class that inherits from the first and second object classes; and instantiating an object of the third object class in the third block in representing a third signal type in the graphical modeling environment.

67. The medium of claim 62, wherein the method further comprises:

defining an interface block in the graphical modeling environment;

receiving at an input of the interface block a signal type representing an instance of the second object class; and in the interface block, decapsulating the instance of the second object class to produce a signal type representing an instance of the first object class at a first output of the interface block and produce a signal type representing an instance of the second object class at a second output of the interface block.

68. The medium of claim 62, wherein the method further comprises:

defining a third block in the graphical modeling environment;

receiving at a first input of the third block a signal type representing an instance of the first object class;

receiving at a second input of the third block a signal type representing an instance of the second object class;

in the third block, instantiating an object of a third object class that inherits from the first and second object classes; and representing an instance of the object of the third object class as a third signal type propagating from an output of the third block.

69. In a graphical modeling environment, a method comprising:

providing a first signal type for a first signal in the graphical modeling environment, said signal type deriving from a parent signal type;

instantiating the first signal type in representing the first signal in a model in the graphical modeling environment;

providing a block in the graphical modeling environment having a structure and operation for processing a second signal representing the parent signal type;

receiving the first signal at a port of the block; and processing a portion of the first signal in the block using the structure and operation.

70. The method of claim 69, in which the block is connected to one of the first signal and the second signal by means of graphically rendered ports, wherein said graphically rendered ports include a graphical representation capable of being viewed by a user.

71. The method of claim 69, in which a portion of the block is free of graphically rendered ports for connecting to one of the first signal and the second signal, wherein said portion of the block includes ports free of a graphical representation viewed by a user.

72. A device readable storage medium holding device executable instructions for performing a method in a graphical modeling environment, the method comprising:

providing a second signal type for a signal in the graphical modeling environment, said signal type deriving from a first signal type;

instantiating the second signal type in representing the signal in a model in the graphical modeling environment;

providing a block in the graphical modeling environment having a structure and operation for processing a signal representing the first signal type;

receiving the signal of the second signal type at a port of the block; and processing a portion of the signal in the block using the structure and operation.

73. The medium of claim 72, wherein the signal in the model in the graphical modeling environment represents the first signal type.

74. The medium of claim 72, in which the block is connected to one or more of the first signal types and one or more of the second signal types by means of graphically rendered ports, wherein said graphically rendered ports include a graphical representation capable of being viewed by a user.

75. The medium of claim 72, in which a portion of the block is free of graphically rendered ports for connecting to one or more of the first signal types and one or more of the second signal, wherein said portion of the block includes ports free of a graphical representation viewed by a user.

76. An electronic device for use in practicing a technical computing environment, the technical computing environment for developing and performing engineering and scientific related functions, the electronic device comprising:

an input device for use by a user;

a graphical model environment providing a first signal type; and an interface responsive to inputs from the user to communicate with the graphical model environment to define a second signal type that inherits from the first signal type.

77. The electronic device of claim 76, further comprising a display device for viewing by the user, a graphical model having the second signal type.

78. The electronic device of claim 76, further comprising a registry to retain one or more class definition declarations of one or more signal types provided by the graphical model environment.

79. The electronic device of claim 76, wherein the graphical model environment provides a block having a structure and operation for processing a signal representing the first signal type, the block being capable of receiving a signal representing the second signal type at a port of the block and processing a portion of the signal representing the second signal type using the structure and operation for processing the signal representing the first signal type.

* * * * *